Patented Aug. 22, 1933

1,923,594

UNITED STATES PATENT OFFICE 1,923,594

PROCESS FOR PRODUCING ANHYDROUS NONVOLATILE METAL CHLORIDES

Robert Suchy, Karl Staib, and Wilhelm Moschel, Bitterfeld, Germany, assignors, by mesne assignments, to Magnesium Development Corporation, a Corporation of Delaware No Drawing. Application April 23, 1929, Serial No. 357,494, and in Germany April 24, 1928

2 Claims. (Cl. 23—91)

This invention relates to a process for the production of anhydrous nonvolatile chlorides, in particular such as magnesium chloride.

In the specification of U. S. Patent No. 1,702,301, there has been described a process of producing anhydrous chlorides free from oxides, from corresponding oxides or corresponding oxide-containing substances and gaseous chloride-forming agents, for example, such as hydrochloric acid gas, phosgene and mixtures capable of forming the same, which consists in causing the oxides or oxide-containing substances in the form of a suspension in fused chloride or in fused mixtures of chlorides, to flow down a heated irrigation layer in countercurrent to an ascending current of the gaseous chloride-forming agent.

In the further development of this process it has been found that the same can advantageously be combined with the process described in United States Patent 1,749,854 wherein there has been disclosed a process for the production of anhydrous magnesium chloride by subjecting formed pieces or briquettes made of a mixture of magnesium oxide or of a substance containing magnesium oxide as magnesium oxychloride or magnesium carbonate, with a poreforming substance, such as hydrated magnesium chloride and a reducing substance capable of producing a porosity when heated, to the action of a chlorinating agent at elevated temperatures below the melting point of magnesium chloride. In the course of the process of U. S. application Serial No. 107,269 the formed pieces or briquettes are preliminarily dried which drying process may also be effected in a separate chamber and the formed pieces or briquettes thereby attain a porosity corresponding at least to the increase in volume caused by the following transformation of the magnesium oxide or magnesium oxide-containing substance into magnesium chloride.

The combination of the processes of U. S. Patent No. 1,702,301 and application Serial No. 107,269, according to our invention, may be effected by arranging, in a suitable container, for example, a shaft, an electrically heated irrigating layer as described in United States Patent 1,702,301, arranging highly porous, carbonized formed pieces or briquettes, produced as described in United States Patent 1,749,854, above said irrigating layer and causing said pieces or briquettes to react with a chlorinating agent which is introduced at the lower end of the irrigating layer and after having passed through the entire irrigating layer issues into the layer of formed pieces or briquettes.

The highly exothermic character of the reaction increases the temperature of the reacting substances and thus accelerates the conversion to a considerable extent, the conversion taking place chiefly according to the process described in application Serial No. 107,269. However, in contradistinction to the process cited before, the solid product of the conversion is not withdrawn now, but is allowed to melt by raising the temperature, in the parts of the bed of briquettes immediately overlying the irrigation layer, to a temperature above the melting point of this intermediate chlorination product. The fused impure magnesium chloride is immediately received by the irrigation surfaces and, having a temperature of about 800° C., flows over the same in counter-current to the ascending current of concentrated chlorine gas thus offering a large superficial area to the latter. By this procedure, the last traces of magnesia which may still be suspended in the magnesium chloride are also readily converted into magnesium chloride. As any contaminations of the raw material which are inaccessible to chlorination, as for instance carbon, or silica, will be retained on the top of the irrigation layer while the fused magnesium chloride passes downwards, a very pure magnesium chloride is thus obtained in a single operation in an anhydrous fused state from magnesia or from substances adapted to form magnesia.

The chlorine which remains unconsumed in the main reaction zone is completely taken up by the formed pieces overlying the reaction zone proper and heated by the waste gases. The hydrochloric acid forming part of the waste gases may be absorbed by a suspension of magnesia to form the lye of magnesium chloride serving as a binder.

The process can be performed continuously by feeding briquettes on the top of the shaft and withdrawing the molten chloride from the bottom of the irrigation layer.

Example 380 parts of mineral magnesite and 70 parts of magnesia are intimately mixed with 200 parts of ground peat and 60 parts of charcoal; after wetting by means of 340 parts of a waste lye of magnesium chloride having a specific gravity of 1.285 the mixture is briquetted, dried and carbonized at about 500 to 600° C. The briquettes thus obtained are continuously heaped in a shaft on a layer of coke heated electrically to about 800° C., and are exposed to an ascending current of chlorine. Anhydrous molten magnesium chloride is withdrawn from the bottom of the irrigation layer. Said molten anhydrous magnesium chloride contains about 97.5% $MgCl_2$, 1% $CaCl_2$, 1.5% $KCl+NaCl$, less than 0.1% MgO, and is free from sulfates, silica, chlorides of iron and aluminium.

We claim:

1. A process for producing anhydrous non-volatile metal chlorides substantially free from impurities, and particularly from oxidic compounds, which comprises substantially completely converting an oxidic compound of said metal to the chloride in the solid state by treating briquettes formed of a mixture of said oxidic compound and a carbonaceous material having a porosity sufficient to accommodate the increase in volume caused by such conversion, with a hot gaseous chlorinating agent at a temperature below the melting point of the metal chloride, fusing said chlorinated product by the combined heat of reaction and sensible heat of the chlorinating agent and further chlorinating said fused product by passing it through a heated porous bed counter-current to a rising stream of hot chlorinating gas.

2. A process for producing anhydrous magnesium chloride substantially free from impurities, and particularly from magnesium oxide, which comprises substantially completely converting magnesium oxide to the chloride in the solid state by treating briquettes formed of a mixture of said magnesium oxide and a carbonaceous material having a porosity sufficient to accommodate the increase in volume caused by such conversion, with hot chlorine gas at a temperature below the melting point of the metal chloride, fusing said chlorinated product by the combined heat of reaction and sensible heat of the chlorine and further chlorinating said fused product by passing it through a heated porous bed counter-current to a rising stream of hot chlorine gas.

ROBERT SUCHY.
KARL STAIB.
WILHELM MOSCHEL.